United States Patent [19]

Andersen et al.

[11] Patent Number: 4,502,871
[45] Date of Patent: Mar. 5, 1985

[54] APPARATUS AND METHOD FOR SEPARATING WAX FROM AN ENTRAINER GAS

[75] Inventors: Ingar F. Andersen, Bow/Concord, N.H.; Timothy W. Lutts, Salem; Eddie W. Lam, Newton, both of Mass.

[73] Assignee: GCA Corporation, Bedford, Mass.

[21] Appl. No.: 462,600

[22] Filed: Feb. 1, 1983

[51] Int. Cl.³ .......................... B01D 50/00; B01D 8/00
[52] U.S. Cl. ............................................ 55/82; 55/96; 55/97; 55/269; 55/301; 55/319; 55/325; 55/327; 55/337; 266/148; 266/152
[58] Field of Search ................ 55/80, 82, 96, 97, 269, 55/282, 301, 319, 325, 327, 332, 337, 442, 466, 525, 526, DIG. 10; 266/148, 152, 157

[56] References Cited

U.S. PATENT DOCUMENTS

| | | | |
|---|---|---|---|
| 1,195,044 | 8/1916 | Lockwood | 55/442 |
| 1,438,611 | 12/1922 | Rverson | 55/442 |
| 2,583,013 | 1/1952 | Patterson | 55/82 |
| 3,892,550 | 7/1975 | Riis | 55/466 |
| 3,950,152 | 4/1976 | Guon | 55/96 |

OTHER PUBLICATIONS

R. Bauer, "Recent Developments in Automated Vacuum Sintering", pp. 16/16–13.
The Demister Styles and Materials, Otto H. York Company, Inc. Bulletin 44.

Primary Examiner—David L. Lacey
Attorney, Agent, or Firm—Henry D. Pahl, Jr.

[57] ABSTRACT

Disclosed is a wax condenser for separating wax from an entrainer gas (or sweep gas) which is introduced into a sintering furnace and then pumped out in order to remove the wax from the furnace. The condenser includes a hot chamber and a cold chamber. Wax is removed by the condenser in three ways. After the entrainer gas enters the hot chamber of the condenser from the sintering furnace, it will pass through a heated filter. The heated filter will capture a large percentage of the wax present in the entrainer gas. The entrainer gas passes from the heated filter through a flow-restricting aperture which is located in a barrier separating the hot chamber from the cold chamber. This flow restricting aperture causes a pressure drop across the barrier. When the entrainer gas passes through the aperture, an expansion of the entrainer gas takes place due to the drop in pressure associated with the passing of the entrainer gas through the flow restricting aperture. This expansion causes a cooling of the entrainer gas and wax which in turn results in the formation of solid wax particles. The entrainer gas carriers these solid wax particles to a centrifugal separator which provides further separation of the wax from the entrainer gas. Finally, the wax particles are further removed from the entrainer gas by a flow-line interrupter before the entrainer gas reaches the pump.

25 Claims, 1 Drawing Figure

APPARATUS AND METHOD FOR SEPARATING WAX FROM AN ENTRAINER GAS

BACKGROUND OF THE INVENTION

This invention relates to sintering and more particularly to an apparatus for separating and condensing wax from an entrainer (sweep gas) which carries the wax from a sintering furnace.

A sintering furnace takes a consolidated mass of powder and heats it in order to produce a material with a density close to a solid wrought metal. This consolidated mass of powder is held together by a binder (or lubricant) which is preferably paraffin.

Before the sintering process can begin, the particles of the consolidated mass must be separated from the wax which is holding the mass together. Batch sintering furnaces have been developed which will dewax the particles and then sinter the particles in the same chamber. In such furnaces, however, the wax must be removed from the furnace before the sintering begins.

One method of removing this wax involves the use of a "sweep" gas which entrains the wax. This sweep gas is preferably argon or nitrogen but may also be helium, hydrogen or any other residual gas typically found in a vacuum furnace. The sweep gas is introduced into the system before or during the dewaxing. Once the sweep gas has entered the furnace it must be pumped out along with the wax that has been entrained. The wax present in the sweep gas will, however, clog the pump.

To prevent clogging of the pump the wax must be removed from the sweep gas before it reaches the pump. A number of devices have been employed to accomplish this objective. Among these are falling film heat exchangers, packed bed condensers and electrostatic precipitators. These devices have been found to be only partially effective in removing the wax.

It is therefore an object of this invention to provide a wax condenser which will separate a high percentage of the wax from an entrainer gas.

Another object of this invention is to provide a wax condenser that can be used both in conjunction with a sweep gas which is introduced into a furnace in order to remove wax and in vacuum removal of wax.

It is a further object of this invention to provide a wax condenser that is of a simple construction with easily removable components in order to facilitate wax removal and maintenance.

Still another object of this invention is to provide a wax condenser which is highly reliable and efficient.

SUMMARY OF THE INVENTION

The present invention is a wax condenser for use in separating wax from a sweep gas (or entrainer gas) which has carried this wax from a metal sintering furnace. The wax condenser which is divided into a hot and cold chamber has three different means for separating the wax from the sweep gas. The sweep gas with the entrained wax is drawn by the pump into the hot chamber of the wax condenser. The mixture passes through a heated filter in the hot chamber. This heated filter captures a high percentage of wax present in the entrainer gas. The captured wax drips from the heated filter to a container at the bottom of the hot chamber.

After the entrainer gas has been treated by the heated filter, it passes through a flow-restricting aperture in a barrier which separates the hot chamber from the cold chamber. This flow-restricting aperture causes a pressure drop across the barrier. After the entrainer gas passes through the flow-restricting aperture into the cold chamber, an expansion of the entrainer gas takes place due to the drop in pressure associated with the passing of the entrainer gas through the aperture. This expansion causes a cooling of the entrainer gas and wax which in turn results in the formation of solid wax particles. The entrainer gas carrying the wax then flows to a centrifugal separator located within the cold chamber which causes a further separation of the particles from the entrainer gas. Finally, before exiting from the wax condenser, the entrainer gas passes through a flow line interrupter where additional wax is trapped by a series of baffles. At this point, approximately 95–100% of the wax has been removed from the entrainer gas thereby eliminating the problem of wax clogging the pump.

These and other features and objects of the present invention will be more fully understood from the following detailed description which should be read in light of the accompanying drawing.

DETAILED DESCRIPTION OF THE PREFERRED EMBODIMENT

Figure 1:
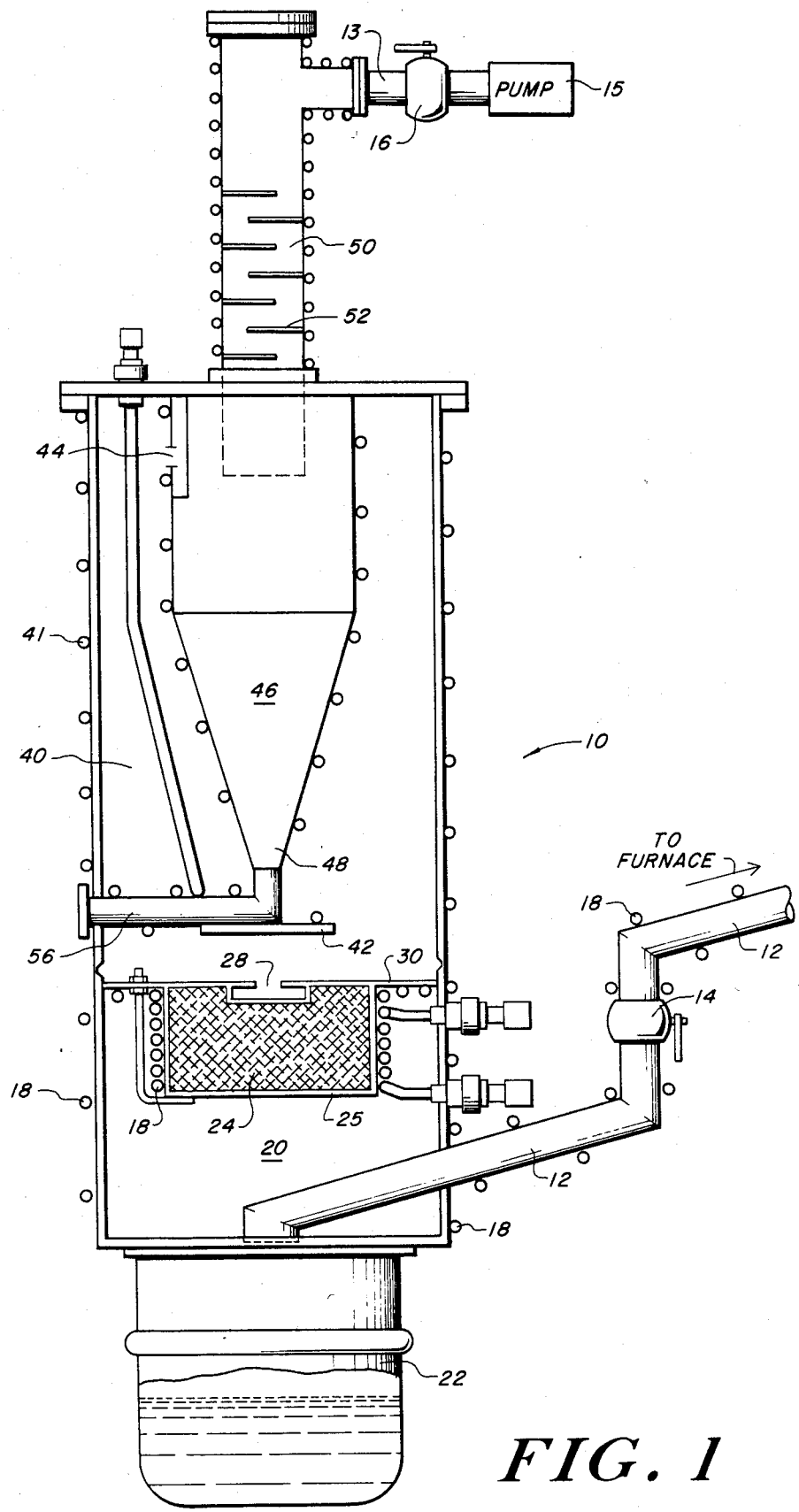
FIG. 1 is a cross-sectional view of the wax condenser according to the present invention.

Referring to FIG. 1 there is shown a wax condenser 10 according to the present invention. This condenser 10 is preferably used in conjunction with a batch type sintering furnace (not shown) which will both dewax and sinter in the same chamber. The condenser 10 is positioned between the furnace and a pump 15.

The entrainer gas, carrying the wax which is any substance used as a binder and/or lubricant, travels from the sintering furnace to the wax condenser 10 through a pipe 12. An isolation valve 14 is located in the pipe between the condenser 10 and the furnace. When the isolation valve 14 is in the open position a sweep gas containing wax flows from the sintering furnace to the wax condenser 10, and when the valve is closed the sweep gas will not flow from the furnace to the condenser. A pipe 13 leading from the condenser to the pump 15 also contains an isolation valve 16. When both valves 14, 16 are closed, the condenser is isolated from the furnace. The sweep gas and the entrained wax are kept hot as they travel from the furnace to the wax condenser by hot water which flows through a series of coils 18 which surround the pipe 12.

The wax condenser 10 is divided up into two chambers: a hot chamber 20 and a cold chamber 40. The hot chamber 20 is positioned directly below the cold chamber 40. The sweep gas is pumped from the furnace into the hot chamber 20 of the wax condenser 10. The gas is directed to a point above a pot 22 which forms a lower boundary of the hot chamber 20. Positioned adjacent to the upper boundary of the hot chamber 20 is a heated filter 24 which is preferably a bronze wool filter. This heated filter 24 can also be manufactured out of any other high conductivity material. The sweep gas carrying the wax travels through the heated filter 24. The heated filter 24 as well as the entire hot chamber are also kept hot by a series of coils 18 containing hot circulating water which are positioned about both the exterior of the housing 25 of the filter and the exterior surfaces of the hot chamber 20.

The heated filter 24 performs a major part of the removing of the wax. As the entrainer gas carrying the wax travels through the heated filter 24, the wax is trapped by the filter 24. The wax trapped by the heated filter 24 drips down into the pot 22 which is located directly below the heated filter 24. After a period of use, the liquid wax that has accumulated at the bottom of the pot 22 must be removed from the pot 22.

After the gas passes through the heated filter 24 and a portion of the wax has been captured by the heated filter 24, the sweep gas carrying the remaining wax will pass through a flow-restricting aperture 28 in a barrier 30 which separates the hot chamber 20 from the cold chamber 40. The barrier 30 is heated so that if any wax makes contact with it, the wax will not condense but rather drip down into the pot 22. It is important that the size of the flow-restricting aperture 28 be kept small in order to cause a pressure drop across the barrier 30.

As the gas enters the cold chamber 40 through the flow-restricting aperture 28 an expansion of the sweep gas occurs. This expansion is caused by the drop in pressure associated with the passing of the entrainer gas through the flow-restricting aperture 28. This expansion results in a cooling of the entrainer gas and wax, and as a result the wax condenses causing solid particle or snowlike precipitation in the cold chamber 40.

A cold plate 42 is positioned directly over and just slightly above the aperture 28 in order to assure that the wax remains in solid particle form. Cold plate 42 will solidify any wax present in the cold chamber 40 which strikes it. The entire cold chamber 40 is kept cold by a series of coils 41 containing cold circulating water. These coils 41 surround the cold chamber, and they assure that any particles which strike a surface of the cold chamber will remain in solid form.

After the entrainer gas, including the solid particles, enters the cold chamber 40, it will eventually flow through an opening 44 which leads to a centrifugal separator 46. Centrifugal separator 46 will cause the removal of a portion of the solid wax remaining in the entrainer gas. This removed wax settles in the throat 48 of the centrifugal separator 46 where it will be removed when the condenser is not in use.

The entrainer gas treated in the centrifugal separator 46 exists from the centrifugal separator 46 into a flow-line interrupter 50 where further wax removal from the entrainer gas takes place. Preferably, the flow-line interrupter 50 is a hollow tube-like structure containing a series of baffles 52. These baffles 52 are placed in horizontal positions in the interrupter and when so placed they cover greater than 50% of the area of the plane within the interrupter along which they lie. These baffles are positioned alternately on opposite walls of the interrupter 50. In addition, either the vertical distance between two adjacent baffles 52 or the horizontal distance between each baffle 52 and its opposite wall (not shown in FIG. 1) steadily decreases along the flow path of the entrainer gas. Wax is trapped by the interrupter 50 when it strikes these baffles. Ideally, the design incorporating decreased openings would capture larger wax particles with the lower baffles while the smaller wax particles would be trapped by the upper baffles.

After the entrainer gas passes through the flow-line interrupter 50 it leaves the condenser 10 and enters the pump (not shown) where it is pumped to the ambient atmosphere.

Test runs have shown that by the time the entrainer gas leaves the condenser 10, 97-99% of the wax (by weight) initially entrained has been accounted for. A large percentage of this condensed wax is collected in the pot 22 from which it can easily be removed. The remainder (usually less than 10% of the wax) either settles in the throat of the separator 46 or is trapped on the baffles 52 of the interrupter 50. To clear this wax from the cold chamber 40 of the condenser, hot water is circulated through the coils 41 which causes the cold chamber 40 to heat up.

Preferably, both isolation valves 14, 16 are closed during clearing of the condenser. When cold chamber 40 is heated up the solidified wax particles liquify and can easily be valved out through opening 56.

Although in the preferred embodiment heating of components of the apparatus is achieved through hot circulating water which flows through coils surrounding the component of the apparatus to be heated, the heated components of the apparatus can also either be heated by coils containing other substances or they can be heated electrically.

Also, although the preferred embodiment describes the condenser as removing wax from an entrainer gas, it should be noted once again that wax is defined as any substance which can be used as a binder and/or a lubricant in a sintering process.

In view of the foregoing, it may be seen that several objects of the present invention have been achieved and other advantageous results obtained.

As various changes could be made in the above preferred embodiment without departing from the scope of the invention, it should be understood that all matter contained in the above description or shown in the accompanying drawing shall be interpreted as illustrative and not in a limiting sense.

What is claimed is:

1. An apparatus for separating wax, which is any substance used as a binder and/or a lubricant, from an entrainer gas which is drawn by a pump into the apparatus comprising:

a hot chamber into which the entrainer gas is drawn through an entrainer gas inlet in said hot chamber;

a heated filter positioned in said hot chamber, said heated filter being located adjacent an aperture in a wall of said hot chamber, said aperture providing an outlet for said entrainer gas from said hot chamber;

means for heating said hot chamber and said heated filter;

means for drawing the entrainer gas through said apparatus;

a cold chamber positioned adjacent said wall of said hot chamber which includes said aperture, said wall forming a barrier between said hot chamber and said cold chamber, and said aperture being a flow-restricting aperture which caused a pressure drop as said entrainer gas passes through said aperture, said pressure drop resulting in an expansion of said entrainer gas thereby cooling said wax into solid particles in said cold chamber;

means for maintaining a low temperature in said cold chamber;

cold chamber separating means for further separating wax from the entrainer gas;

outlet means for allowing the entrainer gas to escape the apparatus;

whereby when said entrainer gas passes through said heated filter a portion of said wax is removed from the entrainer gas by said filter before said entrainer gas enters said cold chamber.

2. The apparatus for separating wax from an entrainer gas of claim 1 wherein said cold chamber separating means comprises:
a centrifugal separator located in said cold chamber, said centrifugal separator including an entrainer gas inlet and an entrainer gas outlet.

3. The apparatus for separating wax from an entrainer gas of claim 1 further comprising:
a flow-line interrupter in flow communication with said cold chamber, said flowline interrupter including an entrainer gas inlet and an entrainer gas outlet.

4. The apparatus for removing wax from an entrainer gas of claim 3 wherein said flow-line interrupter comprises a series of spaced baffles with the vertical distance between adjacent baffles decreasing from the lowermost baffle to the uppermost baffler whereby as the entrainer gas carrying wax passes through said flow-line interrupter said baffles trap wax which strike said baffles.

5. The apparatus for separating wax from an entrainer gas of claim 1 further comprising:
a centrifugal separator located in said cold chamber, said centrifugal separator including an entrainer gas inlet and an entrainer gas outlet;
a flow-line interrupter in flow communication with said centrifugal separator, said flow-line interrupter also including an entrainer gas inlet and an entrainer gas outlet.

6. The apparatus for removing wax from an entrainer gas of claim 5 wherein said flow-line interrupter comprises a series of spaced baffles with the vertical distance between adjacent baffles decreasing from the lowermost baffle to the uppermost baffle whereby as the entrainer carrying wax passes through said flow-line interrupter said baffles trap wax which strike said baffles.

7. The apparatus for separating wax from an entrainer gas of claim 1 wherein said heated filter is a bronze wool filter.

8. An apparatus for separating wax, which is any substance used as a binder and/or a lubricant, from an entrainer gas which is drawn by a pump into the apparatus comprising:
a hot chamber and a cold chamber;
means for separating said hot chamber from said cold chamber and for causing a pressure drop as said entrainer passes from said hot chamber to said cold chamber, said pressure drop resulting in an expansion of said entrainer thereby cooling said wax into solid particles in said cold chamber;
a heated filter positioned in said hot chamber adjacent said means for separating said hot chamber from said cold chamber, said heated filter providing a means for trapping wax attempting to pass through said means for separating said hot chamber from said cold chamber;
means for heating said hot chamber and said heated filter;
means for maintaining a low temperature in said cold chamber;
a centrifugal separator located in said cold chamber, said centrifugal separator having an entrainer gas inlet and an entrainer gas outlet.

9. The apparatus for separating wax from an entrainer gas of claim 8 further comprising a flow-line interrupter in flow communication with said contrifugal separator, said flow-line interrupter having an entrainer gas inlet and an entrainer gas outlet.

10. The apparatus for removing wax from an entrainer gas of claim 9 wherein said flow-line interrupter comprises a series of spaced baffles whereby as the entrainer gas carrying wax passes through said flow-line interrupter, said baffles trap wax which strike said baffles, the vertical distance between adjacent baffles decreases from the lowermost baffle to the uppermost baffle.

11. The apparatus for separating wax from an entrainer of claim 8 wherein said heated filter is a bronze wool filter.

12. The apparatus for separating wax from an entrainer gas of claim 8 wherein said means for causing a pressure drop comprises a flow-restricting aperture located in said means for separating said hot chamber from said cold chamber, said flow-restricting aperture being the means through which said hot chamber communicates with said cold chamber, said flow-restricting aperture causing a pressure drop as said entrainer gas passes through said means for separating said hot chamber from said cold chamber.

13. An apparatus for separating wax, which is any substance used as a binder and/or a lubricant, from an entrainer gas which is drawn by a pump into the apparatus comprising:
a hot chamber and a cold chamber;
means for separating said hot chamber from said cold chamber and for causing a pressure drop as said entrainer gas passes from said hot chamber to said cold chamber, said pressure drop resulting in an expansion of said entrainer gas thereby cooling said wax into solid particles in said cold chamber;
a heated filter positioned in said hot chamber adjacent said means for separating said not chamber from said cold chamber, said heated filter providing a means for trapping wax attempting to pass through said means for separating said hot chamber from said cold chamber;
means for heating said hot chamber and said heated filter;
means for maintaining a low temperature in said cold chamber;
a flow-line interrupter in flow communication with said cold chamber, said flow-line interrupter having an entrainer gas inlet and an entrainer gas outlet.

14. The apparatus for separating wax from an entrainer gas of claim 13 further comprising a centrifugal separator located in said cold chamber, said centrifugal separator having an entrainer gas inlet and an entrainer gas outlet.

15. The apparatus for separating wax from an entrainer gas of claim 13 wherein said heated filter is a bronze wool filter.

16. The apparatus for separating wax from an entrainer gas of claim 13 wherein said means for causing a pressure drop comprises a flow-restricting aperture located in said means for separating said hot chamber from said cold chamber, said flow-resisting aperture being the means through which said hot chamber communicates with said cold chamber, said flow-restricting aperture causing a pressure drop as said entrainer passes through said means for separating said hot chamber from said cold chamber.

17. The apparatus for removing wax from an entrainer gas of claim 13 wherein said flow-line interrupter comprises a series of spaced baffles with the vertical distance between adjacent baffles decreasing from the lowermost baffle to the uppermost baffle whereby as the entrainer gas carrying wax passes through said flow-line interrupter said baffles trap wax which strike said baffles.

18. An apparatus for separating wax, which is any substance used as a binder and/or a lubricant, from an entrainer gas which is drawn by a pump into the apparatus comprising:
 a hot chamber and a cold chamber, said hot and cold chambers being separated by a barrier;
 a flow-restricting aperture being the means through which said hot chamber communicates with said cold chamber, said flow-restricting aperture causing a build-up of pressure on the hot chamber side of said barrier and causing a pressure drop in said cold chamber as said entrainer gas passes through said flow-restricting aperture, said pressure drop resulting in an expansion of said entrainer gas thereby cooling said wax into solid particles in said cold chamber;
 a filter positioned in said hot chamber adjacent said flow-restricting aperture in said barrier, said filter providing a means for trapping wax attempting to pass through said flow-restricting aperture;
 means for heating said hot chamber and said filter;
 means for cooling said cold chamber;
 a centrifugal separator located in said cold chamber, said centrifugal separator having an entrainer gas inlet and an entrainer gas outlet;
 a flow-line interrupter in flow communication with said centtrifugal separator, said flow line interrupter having an entrainer gas inlet and an entrainer gas outlet.

19. The apparatus for separating wax particles from an entrainer gas of claim 18 wherein said heated filter is a bronze wool filter.

20. The apparatus for separating wax particles from an entrainer gas of claim 18 wherein said means for heating said hot chamber comprises a series of coils surrounding the exterior of said hot chamber, said coils being filled with circulating hot water.

21. The apparatus for separating wax particles from an entrainer gas of claim 18 wherein said means for cooling said cold chamber comprises by a series of coils surrounding the exterior of said cold chamber, said coils being filled with circulating cold water.

22. The apparatus for separating wax particles from an entrainer gas of claim 18 wherein said barrier is heated by a series of coils containing circulating hot water, said coils being located in the hot chamber adjacent to said barrier and defining said heating means.

23. The apparatus for separating wax particles from an entrainer gas of claim 18 wherein said means for heating said filter comprises a series of coils containing circulating hot water, said coils surrounding said filter.

24. The apparatus for removing wax particles from an entrainer gas of claim 18 wherein said flow-line interrupter comprises a series of spaced baffles with the vertical distance between adjacent baffles decreasing from the lowermost baffle to the uppermost baffle whereby as the entrainer gas carrying wax passes through said flow-line interrupter said baffles trap wax particles which strike said baffles.

25. A process for removing wax, which is any substance used as a binder and/or lubricant, from an entrainer gas comprising:
 providing a wax condenser which includes a hot chamber and a cold chamber;
 drawing said entrainer gas in a heated form into said hot chamber of said wax condenser;
 providing a flow-restricting aperture in a barrier between said hot chamber and said cold chamber, said flow-restricting aperture causing a pressure build-up in said hot chamber and a pressure drop in said cold chamber as said entrainer gas passes through said aperture, said pressure drop resulting in an expansion of said entrainer gas thereby cooling said wax into solid particles in said cold chamber;
 providing a heated filter in said hot chamber, said heated filter being located adjacent to said flowrestricing aperture;
 drawing said entrainer gas through said heated filter thereby trapping a portion of the wax carried by the entrainer gas;
 drawing said entrainer gas that exits from said heated filter through said flow-restricting aperture into said cold chamber;
 drawing said entrainer gas carrying solid wax particles through a centrifugal separator thereby further separating said wax from said entrainer gas;
 providng a flow-line interrupter, said flow-line interrupter comprising a series of baffles;
 drawing said entrainer gas through said flow-line interrupter, said flow-line interrupter trapping particles which strike said baffles;
 drawing said entrainer gas into the ambient atmosphere.

* * * * *